United States Patent
Pan (10) Patent No.: US 10,558,044 B2
(45) Date of Patent: Feb. 11, 2020

(54) OPTICAL WAVEGUIDE DEVICE AND HEAD-MOUNTED DISPLAY APPARATUS USING THE SAME

(71) Applicant: Coretronic Corporation, Hsin-Chu (TW)

(72) Inventor: Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/470,874

(22) Filed: Mar. 27, 2017

(65) Prior Publication Data
US 2017/0285346 A1 Oct. 5, 2017

(30) Foreign Application Priority Data

Mar. 30, 2016 (CN) .......................... 2016 1 0190622

(51) Int. Cl.
  *G02B 27/14* (2006.01)
  *G02B 27/01* (2006.01)
  *F21V 8/00* (2006.01)
(52) U.S. Cl.
  CPC ....... *G02B 27/0172* (2013.01); *G02B 6/0035* (2013.01); *G02B 27/145* (2013.01);
  (Continued)
(58) Field of Classification Search
  CPC .. G02B 6/0028; G02B 6/0018; G02B 6/0055; G02B 6/00; G02B 6/0035; G02B 6/0043;
  (Continued)

(56) References Cited

U.S. PATENT DOCUMENTS 5,076,664 A 12/1991 Migozzi
5,821,911 A 10/1998 Jachimowicz
(Continued)

FOREIGN PATENT DOCUMENTS

CN 103513423 1/2014
CN 203673146 6/2014
(Continued)

OTHER PUBLICATIONS

Mirza et al., "Key Challenges to Affordable See Through Wearable Displays: The Missing Link for Mobile AR Mass Deployment", SPIE Proceedings vol. 8720. May 31, 2013, pp. 1-6.
(Continued)

*Primary Examiner* — Mahidere S Sahle
(74) *Attorney, Agent, or Firm* — JCIPRNET (57) ABSTRACT

An optical waveguide device and a head-mounted display apparatus using the same are provided. The optical waveguide device used for transmitting an image light includes a light entering surface, a first side surface, a second side surface, and at least one planar reflective structure. The image light enters the optical waveguide device through the light entering surface. The first side surface is parallel to the second side surface. The at least one planar reflective structure is disposed between the first side surface and the second side surface, and the planar reflective structure is parallel to the first side surface. The planar reflective structure and the light entering surface have a distance therebetween.

14 Claims, 10 Drawing Sheets

(52) U.S. Cl.
CPC ............... *G02B 2027/0118* (2013.01); *G02B 2027/0125* (2013.01)

(58) Field of Classification Search
CPC .... G02B 6/0051; G02B 6/0053; G02B 6/008; G02B 6/10; G02B 27/017; G02B 27/145; G02B 27/01; G02B 27/141; G02B 2027/0178
USPC .................................................. 359/629–640
See application file for complete search history.

(56) References Cited

U.S. PATENT DOCUMENTS

| | | | |
|---|---|---|---|
| 6,356,675 | B1 | 3/2002 | Weiss |
| 7,457,040 | B2 | 11/2008 | Amitai |
| 7,577,326 | B2 | 8/2009 | Amitai |
| 7,710,655 | B2 | 5/2010 | Freeman et al. |
| 8,220,966 | B2 | 7/2012 | Mukawa |
| 8,472,119 | B1 | 6/2013 | Kelly |
| 8,643,948 | B2 * | 2/2014 | Amitai ................. H04N 13/344 359/489.07 |
| 8,743,464 | B1 | 6/2014 | Amirparviz |
| 9,158,113 | B2 | 10/2015 | Amirparviz et al. |
| 9,223,139 | B2 | 12/2015 | Kress et al. |
| 9,915,823 | B1 | 3/2018 | Kress et al. |
| 10,025,033 | B2 | 7/2018 | Wang et al. |
| 2006/0127003 | A1 | 6/2006 | Park et al. |
| 2008/0151379 | A1 * | 6/2008 | Amitai ................. G02B 6/0055 359/630 |
| 2010/0157400 | A1 * | 6/2010 | Dimov ................... G02B 5/188 359/13 |
| 2010/0201953 | A1 | 8/2010 | Freeman et al. |
| 2010/0226656 | A1 | 9/2010 | Niitsu et al. |
| 2011/0187293 | A1 | 8/2011 | Travis |
| 2011/0255303 | A1 * | 10/2011 | Nichol ................... G02B 6/006 362/606 |
| 2012/0062998 | A1 * | 3/2012 | Schultz ............ B29D 11/00663 359/630 |
| 2012/0207432 | A1 | 8/2012 | Travis et al. |
| 2013/0250430 | A1 | 9/2013 | Robbins et al. |
| 2013/0322810 | A1 | 12/2013 | Robbins |
| 2014/0092482 | A1 * | 4/2014 | Dubroca ............ G02B 27/0101 359/633 |
| 2014/0225813 | A1 | 8/2014 | Komatsu et al. |
| 2015/0138451 | A1 | 5/2015 | Amitai |
| 2015/0153569 | A1 * | 6/2015 | Yonekubo .......... G02B 27/0081 359/633 |
| 2015/0226971 | A1 | 8/2015 | Kim et al. |
| 2015/0338656 | A1 * | 11/2015 | Tsuruyama ........ G02B 27/0172 359/630 |
| 2016/0116664 | A1 | 4/2016 | Wheatley et al. |
| 2016/0124232 | A1 * | 5/2016 | Ide ..................... G02B 27/0172 359/13 |
| 2017/0285346 | A1 | 10/2017 | Pan |
| 2018/0059306 | A1 | 3/2018 | Pan et al. |
| 2018/0231783 | A1 | 8/2018 | Weng et al. |

FOREIGN PATENT DOCUMENTS

| | | |
|---|---|---|
| CN | 104204905 | 12/2014 |
| CN | 104216042 | 12/2014 |
| CN | 104503087 | 4/2015 |
| CN | 104656258 | 5/2015 |
| TW | 201428345 | 7/2014 |
| TW | 201502578 | 1/2015 |
| TW | M512138 | 11/2015 |
| WO | 2015148087 | 10/2015 |

OTHER PUBLICATIONS

Watanabe et al., "A Head Mounted Display using the original flexible arm and headband", PRJ6: Wearable Applications, Dec. 11, 2005, pp. 1116-1119.

"Office Action of China Counterpart Application," dated Mar. 1, 2019, p. 1-p. 5.

* cited by examiner

OPTICAL WAVEGUIDE DEVICE AND HEAD-MOUNTED DISPLAY APPARATUS USING THE SAME

CROSS-REFERENCE TO RELATED APPLICATION

This application claims the priority benefit of China application serial no. 201610190622.4, filed on Mar. 30, 2016. The entirety of the above-mentioned patent application is hereby incorporated by reference herein and made a part of this specification.

BACKGROUND OF THE INVENTION

Field of the Invention

The invention relates to an optical waveguide device and a display apparatus, and particularly relates to an optical waveguide device and a head-mounted display apparatus using the optical waveguide device.

Description of Related Art

Near-eye displays (NED) and head-mounted displays (HMD) are killer products of a next generation with a great development potential. Related applications of the NED technique include an augmented reality (AR) technique and a virtual reality (VR) technique. Regarding the AR technique, related technicians devote to provide optimal image quality under a premise of a thin and slim volume.

In a basic optical structure using the HMD to implement the AR technique, after an image light used for displaying is emitted by a projection apparatus, the image light is reflected by a trans-reflective optical device to enter user's eyes. When the beam displaying an image and an external ambient beam enter the user's eyes, a display effect of augmented reality is implemented. However, in the aforementioned structure, the projection apparatus is inevitably appeared in a viewing angle range of the user's eyes, and the aforementioned structure occupies a certain volume. Therefore, a viewing angle of the image actually displayed by the HMD is greatly limited. In order to achieve a wide viewing angle display effect, a beam splitter array waveguide structure is one of the optical structures of the NED for various augmented reality, which is a best choice for balancing factors of wide viewing angle, full-color image and light and slim volume. The optical waveguide device of such structure has a plurality of beam splitters capable of guiding the image light of the projection apparatus to the user's eyes. However, in the HMD of such structure, the image light incident to the optical waveguide device and transmitted in the optical waveguide device cannot effectively fill up a cross-sectional area of the beam splitters. Therefore, the user may view bright and dark strips in the display images of the HMD, and experience a poor display quality of the HMD.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention is directed to an optical waveguide device, which is adapted to transmit an image light, and the image light can be evenly distributed in space after leaving the optical waveguide device, and when the optical waveguide device is applied to a head-mounted display (HMD) apparatus, the HMD apparatus has good display quality.

The invention is directed to a HMD apparatus, which includes the aforementioned optical waveguide device and has good display quality.

Other objects and advantages of the invention can be further illustrated by the technical features broadly embodied and described as follows.

In order to achieve one or a portion of or all of the objects or other objects, an embodiment of the invention provides an optical waveguide device, which is adapted to transmit an image light. The optical waveguide device includes a light entering surface, a first side surface, a second side surface, and at least one planar reflective structure. The image light enters the optical waveguide device through the light entering surface. The first side surface is connected to the light entering surface. The second side surface is connected to the light entering surface, and the first side surface is parallel to the second side surface. The at least one planar reflective structure is disposed between the first side surface and the second side surface, and the planar reflective structure is parallel to the first side surface. The planar reflective structure and the light entering surface have a distance therebetween.

In order to achieve one or a portion of or all of the objects or other objects, an embodiment of the invention provides a head-mounted display apparatus, which includes a display and an optical waveguide device. The display is used for emitting an image light. The optical waveguide device is disposed beside the display, and the optical waveguide device includes a light entering surface, a first side surface, a second side surface, and at least one planar reflective structure. The image light enters the optical waveguide device through the light entering surface. The first side surface is connected to the light entering surface. The second side surface is connected to the light entering surface, and the first side surface is parallel to the second side surface. The at least one planar reflective structure is disposed between the first side surface and the second side surface, and the planar reflective structure is parallel to the first side surface. The planar reflective structure and the light entering surface have a distance therebetween.

According to the above description, the embodiments of the invention have at least one of the following advantages and effects. In the optical waveguide device of the embodiments of the invention, the at least one planar reflective structure is disposed between the first side surface and the second side surface, and the planar reflective structure is parallel to the first side surface. Moreover, the planar reflective structure and the light entering surface have a distance therebetween. The image light entering the optical waveguide device through the light entering surface is divided into a plurality of sub image lights by the planar reflective structure may divide, so as to adjust distribution of the image light in the space. Therefore, the optical waveguide device may transmit the image light and evenly distribute the image light in the space. Since the head-mounted display apparatus of the invention includes the aforementioned optical waveguide device, the user is not liable to view dark strips in a display image of the head-mounted display apparatus, so that the head-mounted display apparatus has good display quality.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention.

Figure 1A:
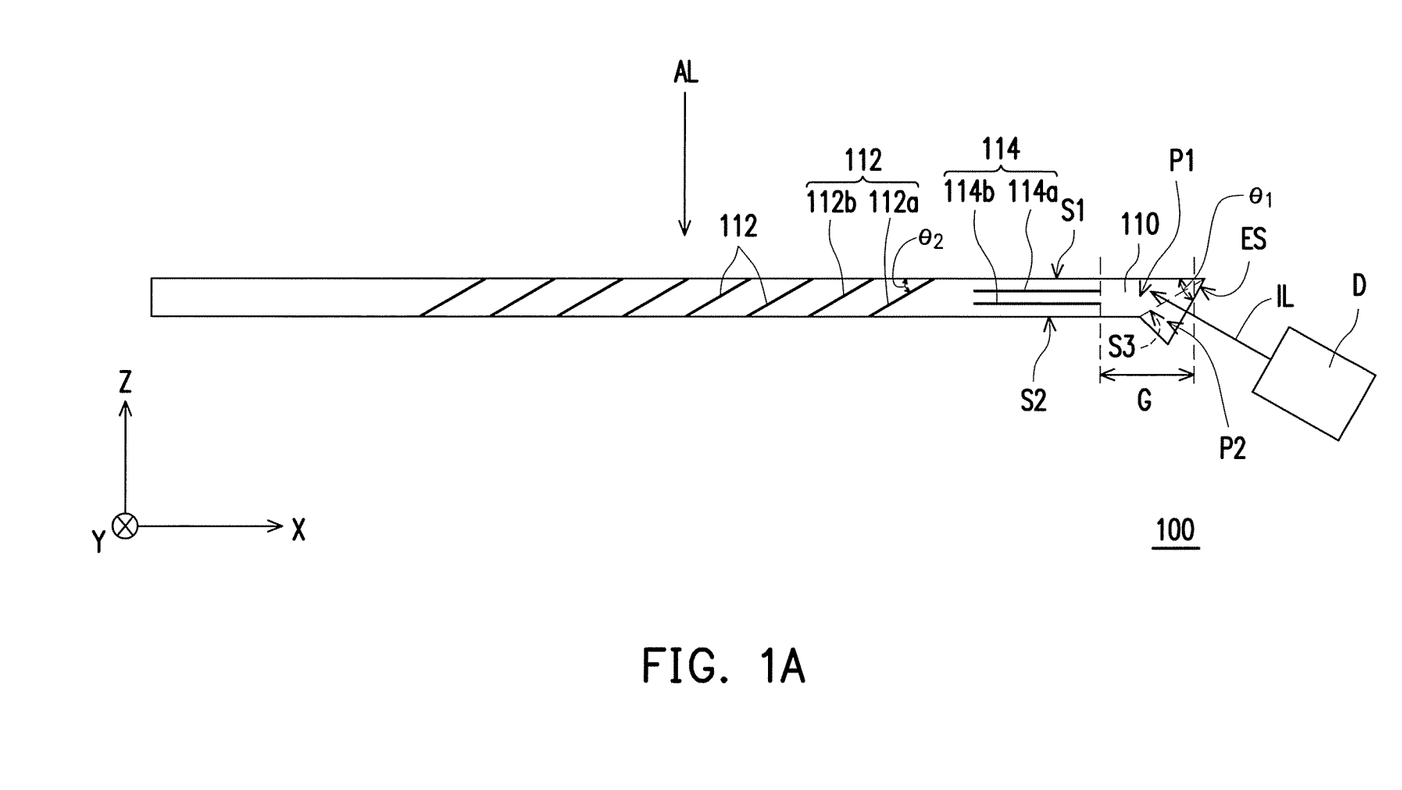
FIG. 1A is a cross-sectional view of a head-mounted display (HMD) apparatus according to an embodiment of the invention.
Figure 1B:
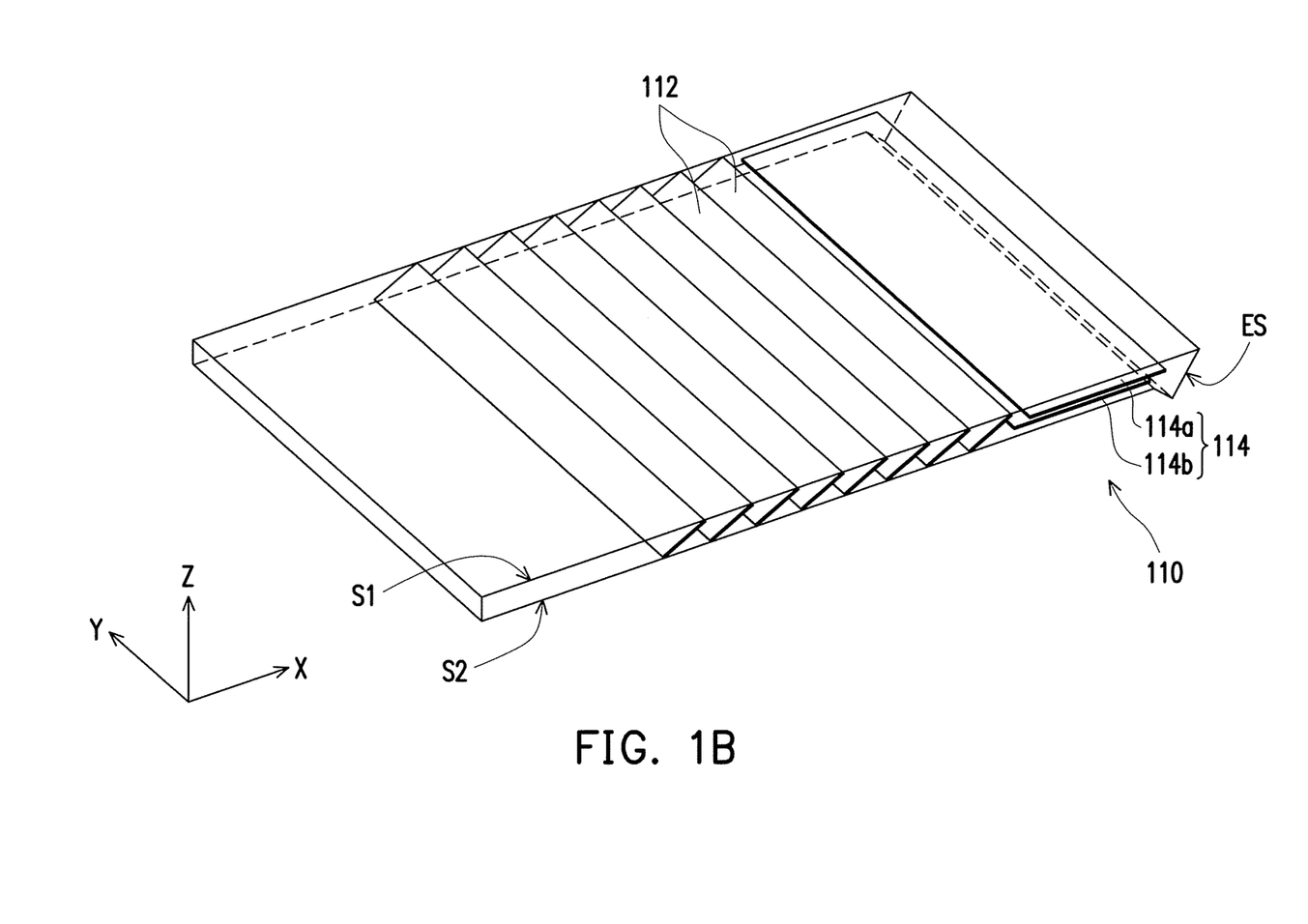
FIG. 1B is a three-dimensional view of an optical waveguide device in the embodiment of FIG. 1A.

FIG. 1A is a cross-sectional view of a head-mounted display (HMD) apparatus according to an embodiment of the invention, and FIG. 1B is a three-dimensional view of an optical waveguide device in the embodiment of FIG. 1A. Referring to FIG. 1A and FIG. 1B, in the embodiment, the HMD apparatus 100 includes a display D and an optical waveguide device 110, where the optical waveguide device 110 is disposed beside the display D. The optical waveguide device 110 includes a light entering surface ES, a first side surface S1, a second side surface S2 and a plurality of beam splitters 112. The first side surface S1 is connected to the light entering surface ES, and the second side surface S2 is connected to the light entering surface ES. The second side surface S2 has an inclined surface and a horizontal surface. The inclined surface of the second side surface S2 is connected to the light entering surface ES. Moreover, the first side surface S1 is parallel to the horizontal surface of the second side surface S2. To be specific, the beam splitters 112 are disposed between the first side surface S1 and the second side surface S2, and the beam splitters 112 are parallel to each other and are arranged in intervals (i.e. two adjacent beam splitters 112 have a distance therebetween). In the embodiment, the HMD apparatus 100 is, for example, located in a space constructed by a first axis X, a second axis Y and a third axis Z, where the first axis X is parallel to an arranging direction of the beam splitters 112. The second axis Y is perpendicular to the first axis X, and a plane constructed by the first axis X and the second axis Y is parallel to the first side surface S1 and the second side surface S2. Moreover, the third axis Z is perpendicular to the first axis X and the second axis Y.

In the embodiment, the display D is used for emitting an image light IL, and the optical waveguide device 110 is used for transmitting the image light IL. To be specific, the image light IL enters the optical waveguide device 110 through the light entering surface ES. Then, the image light IL is propagated between the first side surface S1 and the second side surface S2. Regarding most of the image light IL entering the optical waveguide device 110 through the light entering surface ES, an incident angle of the image light IL incident to the first side surface S1 and the second side surface S2 is greater than a critical angle of total internal reflection, such that the image light IL is transmitted to the beam splitters 112 in the manner of total internal reflection. Then, a part of the image light IL is reflected by at least one of the beam splitters 112, and leaves the optical waveguide device 110 through one of the first side surface S1 and the second side surface S2. To be specific, the beam splitters 112 are neither parallel to the first side surface S1 nor parallel to the light entering surface ES. Each of the beam splitters 112 reflects a part of the image light IL, and the other part of the image light IL penetrates through such beam splitter 112. For example, the beam splitters 112 at least include a beam splitter 112a and a beam splitter 112b adjacent to each other, where the beam splitter 112a is located between the light entering surface ES and the beam splitter 112b. When the image light IL is transmitted to the beam splitter 112a, the beam splitter 112a reflects a part of the image light IL, and the other part of the image light IL penetrates through the beam splitter 112a. The image light IL reflected by the beam splitter 112a, for example, leaves the optical waveguide device 110 through the second side surface S2, and the image light IL penetrating through the beam splitter 112a is transmitted to the beam splitter 112b. The beam splitter 112b reflects a part of the image light IL, and the other part of the image light IL penetrates through the beam splitter 112b. The image light IL reflected by the beam splitter 112b, for example, leaves the optical waveguide device 110 through the second side surface S2, and the image light IL penetrating through the beam splitter 112b is transmitted to a next beam splitter 112. In this way, in the embodiment, the beam splitters 112 may transmit the image light IL emitted by the display D in the optical waveguide device 110.

Moreover, the optical waveguide device 110 can be made of a transparent material (for example, glass, acrylic, or other suitable materials), such that an ambient light AL coming from external may pass through the optical waveguide device 110. In the embodiment, for example, after the image light IL is transmitted by the optical waveguide device 110, the image light IL leaves the optical waveguide device 110 through the second side surface S2 (not shown in FIG. 1A). When the eyes of a user are, for example, located near the second side surface S2 of the optical waveguide device 110, the image light IL leaving the optical waveguide device 110 may enter the eyes of the user, and the ambient light AL coming from external environment may also pass through the optical waveguide device 110 to enter the eyes of the user. Therefore, when the HMD apparatus 100 is placed in front of the eyes of the user, and when the image light IL and the ambient light AL enter the eyes of the user, the user may view a display image (not shown) corresponding to the image light IL, and the user may also view an external image (not shown) corresponding to the ambient light AL, so as to achieve a display effect of augmented reality. In the embodiment, the display D is, for example, a liquid crystal display (LCD), a plasma display, an organic light-emitting diode (OLED) display, an electrowetting display (EWD), an electro-phoretic display (EPD), an electrochromic display (ECD), a digital micromirror device (DMD) or other applicable displays. Moreover, the display D may also be used in collaboration with a projection optical device to provide the image light IL, which is not limited by the invention.

In the embodiment, reflectivities of the beam splitters 112 are gradually increased along a direction away from the light entering surface ES and parallel to the first side surface S1. Moreover, transmittances of the beam splitters 112 are gradually decreased along the direction away from the light entering surface ES and parallel to the first side surface S1. To be specific, the reflectivities of the beam splitters 112 are gradually increased along a direction away from the light entering surface ES and parallel to the first axis X, and the transmittances of the beam splitters 112 are gradually decreased along the direction away from the light entering surface ES and parallel to the first axis X. Based on the aforementioned design of gradual change of the reflectivities and the transmittances of the beam splitters 112, a light intensity of the image light IL is gradually decreased during the process of sequentially passing through the beam splitters 112, and the light intensity of the image light IL reflected by the beam splitters 112 can be maintained consistent along the first axis X. Namely, when the user views the display image (not shown) corresponding to the image light IL, a light intensity distribution of the display image viewed by the user is uniform, and a situation that a part of the display image has a low brightness is avoided.

In the embodiment, the beam splitters 112 of the optical waveguide device 110 are arranged in equal intervals. However, in other embodiments, the beam splitters 112 of the optical waveguide device 110 can also be arranged in unequal intervals according to an actual optical requirement, which is not limited by the invention. Moreover, by suitably designing inclining angles of the light entering surface ES and the beam splitters 112, the image light IL can be transmitted to the user's eyes through the optical waveguide device 110, and when the user normally uses the HMD apparatus 100, the user may view the display image (not shown) corresponding to the image light IL. To be specific, as shown in FIG. 1A, the light entering surface ES of the optical waveguide device 110 and the first side surface S1 include a first included angle $\theta_1$ therebetween, and each of the beam splitters 112 and the first side surface S1 include a second included angle $\theta_2$ therebetween, where the first included angle $\theta_1$ is greater than the second included angle $\theta_2$. For example, the first included angle $\theta_1$ is twice of the second included angle $\theta_2$, so as to decrease a deformation amount of the display image formed by the image light IL. However, in some embodiments, the first included angle $\theta_1$ and the second included angle $\theta_2$ may have other proportional relationship according to an actual optical design requirement, which is not limited by the invention. Besides, in the embodiment, a cross-sectional area of the light entering surface ES of the optical waveguide device 110 is equal to a cross-sectional area of one beam splitter 112. In this way, the optical waveguide device 110 may transmit the image light IL with a proper cross-sectional area in collaboration with the cross-sectional area of one beam splitter 112, such that the display image formed by the image light IL has a proper brightness to avoid a situation that the display image has a too high or too low brightness. However, in some embodiments, the cross-sectional area of the light entering surface ES of the optical waveguide device 110 can be suitably designed to be greater than or smaller than the cross-sectional area of one beam splitter 112 according to an actual optical design requirement, though the invention is not limited thereto.

Referring to FIG. 1A and FIG. 1B, in the embodiment, the optical waveguide device 110 further includes at least one planar reflective structure 114 disposed between the first side surface S1 and the second side surface S2. And, the at least one planar reflective structure 114 is disposed between the beam splitters 112 and the light entering surface ES, too. To be specific, the number of the at least one planar reflective structure 114 is two or more, and the planar reflective structures 114 are arranged in intervals along a direction perpendicular to the first side surface S1. In the embodiment, the planar reflective structures 114, for example, include a planar reflective structure 114a and a planar reflective structure 114b. The planar reflective structure 114a and the planar reflective structure 114b are, for example, disposed between the beam splitters 112a and the light entering surface ES. Moreover, the planar reflective structures 114 are parallel to the first side surface S1, and the planar reflective structures 114 (including the planar reflective structure 114a and the planar reflective structure 114b) and the light entering surface ES have a distance G therebetween, so as to decrease manufacturing difficulty of the optical waveguide device 110.

In detail, the planar reflective structures 114 are used for reflecting the image light IL, and the planar reflective structures 114 are, for example, mirror reflective structures produced by plating a metal film or other types of reflective structures, which is not limited by the invention. In the embodiment, the optical waveguide device 110, for example, has a first part P1 and a second part P2 (shown in FIG. 1A), and the optical waveguide device 110 is formed by adhering the first part P1 and the second part P2 through a connection surface S3, where the first part P1 and the second part P2 are separately fabricated. The planar reflective structures 114 can be first formed in the first part P1, and then adhered to the second part P2 through the connection surface S3, so as to decrease manufacturing difficulty of the optical waveguide device 110. Moreover, an area and a shape of each of the planar reflective structures 114 and a length thereof in of the first axis X can be designed according to an actual optical requirement. For example, orthogonal projections of the planar reflective structures 114a and 114b of FIG. 1A on an XY plane are coincided with each other, and orthogonal projections of the planar reflective structures 114a and 114b of FIG. 1B on the XY plane are not completely coincided, which is not limited by the invention. Moreover, the planar reflective structures 114 may or may not contact the beam splitters 112, and the planar reflective structures 114 may or may not extend to the connection surface S3 of the first part P1 and the second part P2, which is not limited by the invention. To be specific, the second part P2 is away from an end surface of the first part P1, i.e. the light entering surface ES of the optical waveguide device 110 of the embodiment, and the planar reflective structures 114 do not contact the light entering surface ES.

Figure 1C:
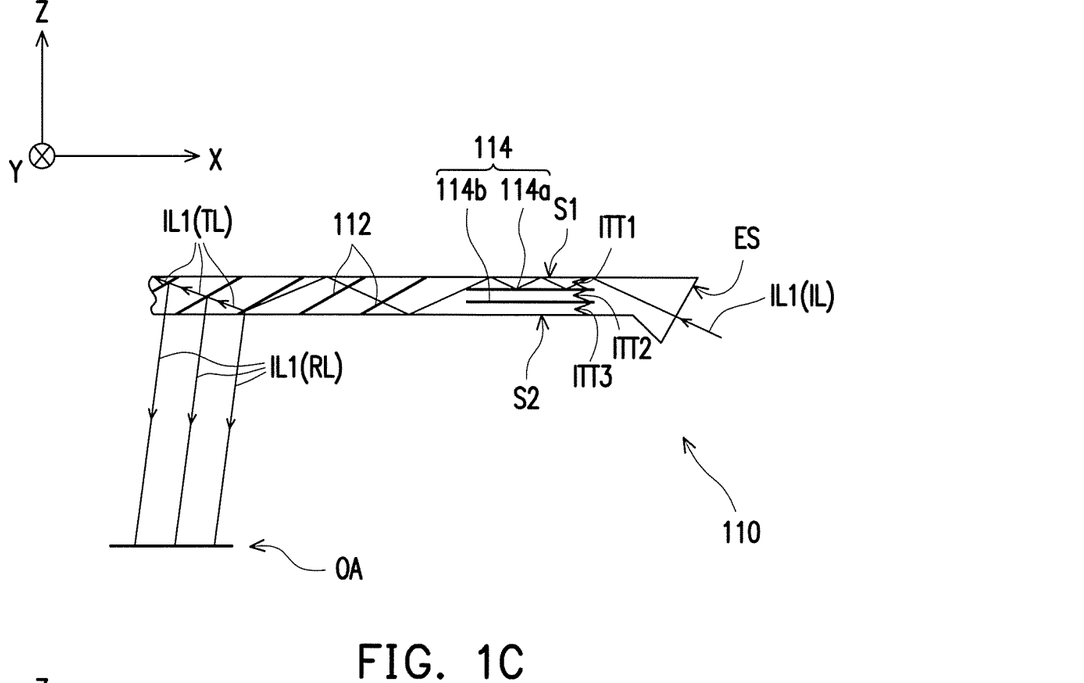
FIG. 1C to FIG. 1E are schematic diagrams of optical paths along which an optical waveguide device of the embodiment of FIG. 1A transmits a part of an image light.
Figure 1D:
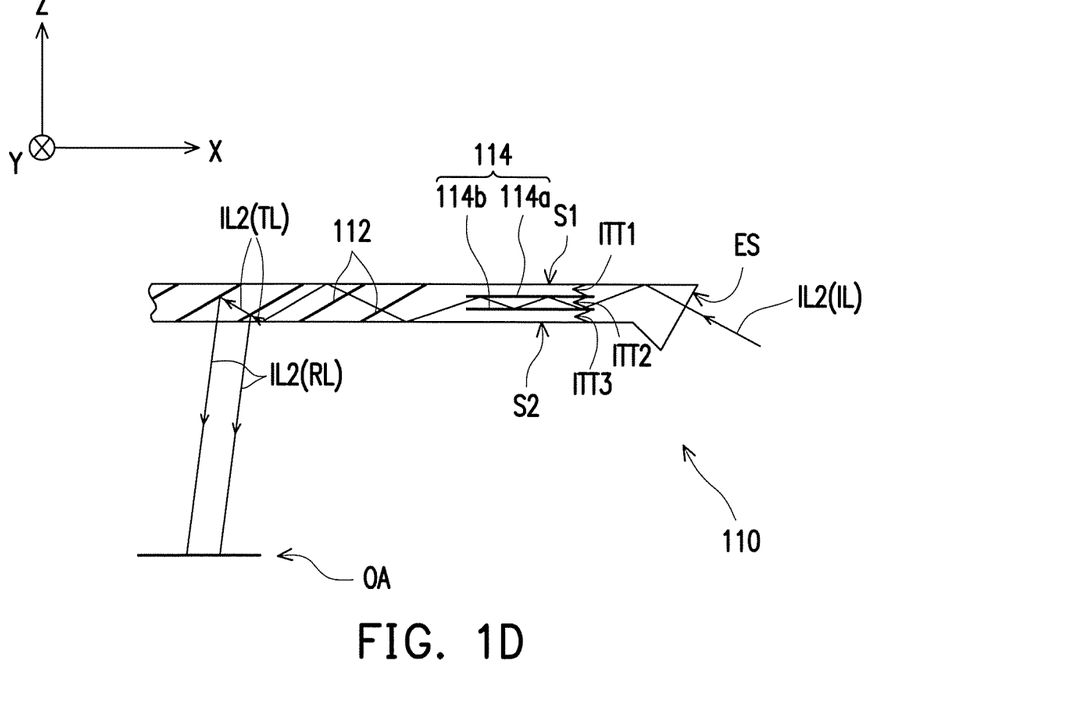
Figure 1E:
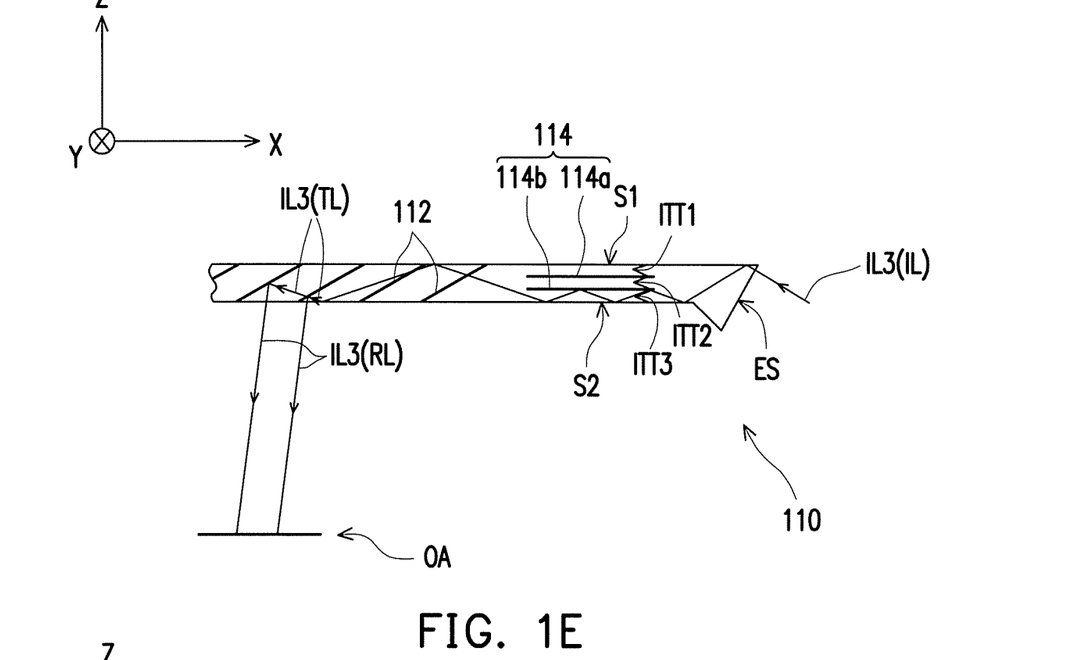

FIG. 1C to FIG. 1E are schematic diagrams of optical paths along which the optical waveguide device of the embodiment of FIG. 1A transmits a part of the image light. Referring to FIG. 1C to FIG. 1E, in the embodiment, the image light IL entering the optical waveguide device 110 is transmitted to one of the beam splitters 112 by the at least one planar reflective structure 114 and at least one of the first side surface S1 and the second side surface S2, and each of the planar reflective structures 114 reflects the image light IL. To be specific, the image light IL includes a sub image light IL1, a sub image light IL2 and a sub image light IL3. In order to clearly indicate a propagating situation of each of the sub image lights in the optical waveguide device 110, FIG. 1C, FIG. 1D and FIG. 1E respectively illustrate the optical paths along which the optical waveguide device 110 transmits the sub image light IL1 the sub image light IL2 and the sub image light IL3, however, the optical waveguide device 110 actually transmits the sub image light IL1 the sub image light IL2 and the sub image light IL3, simultaneously.

Referring to FIG. 1C, in the embodiment, the optical waveguide device 110, for example, has the planar reflective structures 114a and 114b, and the first side surface S1 and the planar reflective structure 114a form a light transmitting tunnel ITT1, the planar reflective structure 114a and the planar reflective structure 114b form a light transmitting tunnel ITT2, and the planar reflective structure 114b and the second side surface S2 form a light transmitting tunnel ITT3. After the sub image light IL1 enters the optical waveguide device 110 through the light entering surface ES, the sub image light IL1 is propagated in the light transmitting tunnel ITT1. To be specific, the sub image light IL1 is propagated between the first side surface S1 and the planar reflective structure 114a along a direction away from the entering surface ES and parallel to the first axis X in a manner of reflection or total internal reflection. Then, the sub image light IL1 leaving the light transmitting tunnel ITT1 is transmitted to the beam splitters 112. A part of the sub image light IL1 penetrates through the beam splitter 112 to form a through light TL, and the through light TL (the sub image light IL1) can be transmitted to a next beam splitter 112. Moreover, the other part of the sub image light IL1 is reflected by the beam splitter 112 to form a reflected light RL. The reflected light RL (the sub image light IL1) may leave the optical waveguide device 110 through the second side surface S2, and is transmitted to an observation area OA. When the user wears the HMD apparatus having the optical waveguide device 110, the user's eyes are, for example, located at the observation area OA, and the sub image light IL1 transmitted to the observation area OA may enter the user's eyes to facilitate the user viewing a display image.

Then, referring to FIG. 1D, in the embodiment, after the sub image light IL2 enters the optical waveguide device 110 through the light entering surface ES, the sub image light IL2 is propagated in the light transmitting tunnel ITT2. The sub image light IL2 is continuously reflected between the planar reflective structure 114a and the planar reflective structure 114b, and is propagated towards a direction away from the entering surface ES and parallel to the first axis X. Then, similarly, through the beam splitters 112, a part of the sub image light IL2 forms the through light TL (the sub image light IL2), and the other part of the sub image light IL2 forms the reflected light RL (the sub image light IL2). The through light TL (the sub image light IL2) can be further propagated to a next beam splitter 112, and the reflected light RL (the sub image light IL2) is transmitted to the observation area OA.

Then, referring to FIG. 1E, in the embodiment, after the sub image light IL3 enters the optical waveguide device 110 through the light entering surface ES, the sub image light IL3 is propagated in the light transmitting tunnel ITT3. The sub image light IL3 is propagated between the planar reflective structure 114b and the second side surface S2 along a direction away from the entering surface ES and parallel to the first axis X in the manner of reflection or total internal reflection. Then, similarly, through the beam splitters 112, a part of the sub image light IL3 forms the through light TL (the sub image light IL3), and the other part of the sub image light IL3 forms the reflected light RL (the sub image light IL3). The through light TL (the sub image light IL3) can be further propagated to a next beam splitter 112, and the reflected light RL (the sub image light IL3) is transmitted to the observation area OA.

Figure 1F:
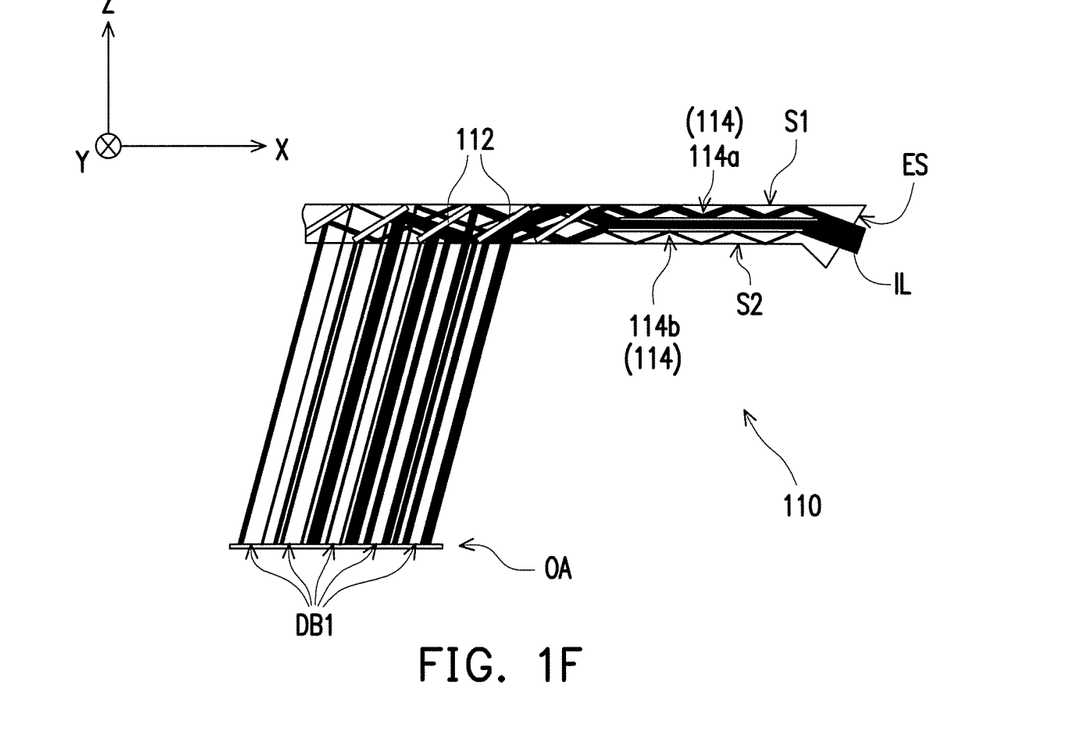
FIG. 1F is a schematic diagram of an optical path along which an optical waveguide device of the embodiment of FIG. 1B transmits an image light.

FIG. 1F is a schematic diagram of an optical path along which the optical waveguide device of the embodiment of FIG. 1B transmits the image light. Referring to FIG. 1B and FIG. 1F, in the embodiment, when the image light IL enters the optical waveguide device 110 through the light entering surface ES, a part of the image light IL is propagated in the light transmitting tunnel ITT1, and a propagating path thereof is similar to the propagating path of the sub image light IL1 of FIG. 1C. Moreover, a part of the image light IL is propagated in the light transmitting tunnel ITT2, and a propagating path thereof is similar to the propagating path of the sub image light IL2 of FIG. 1D. In addition, the other part of the image light IL is propagated in the light transmitting tunnel ITT3, and a propagating path thereof is similar to the propagating path of the sub image light IL3 of FIG. 1E. When the image light IL is propagated to the beam splitters 112, the beam splitters 112 may transmit a part of the image light IL to the observation area OA.

Figure 2A:
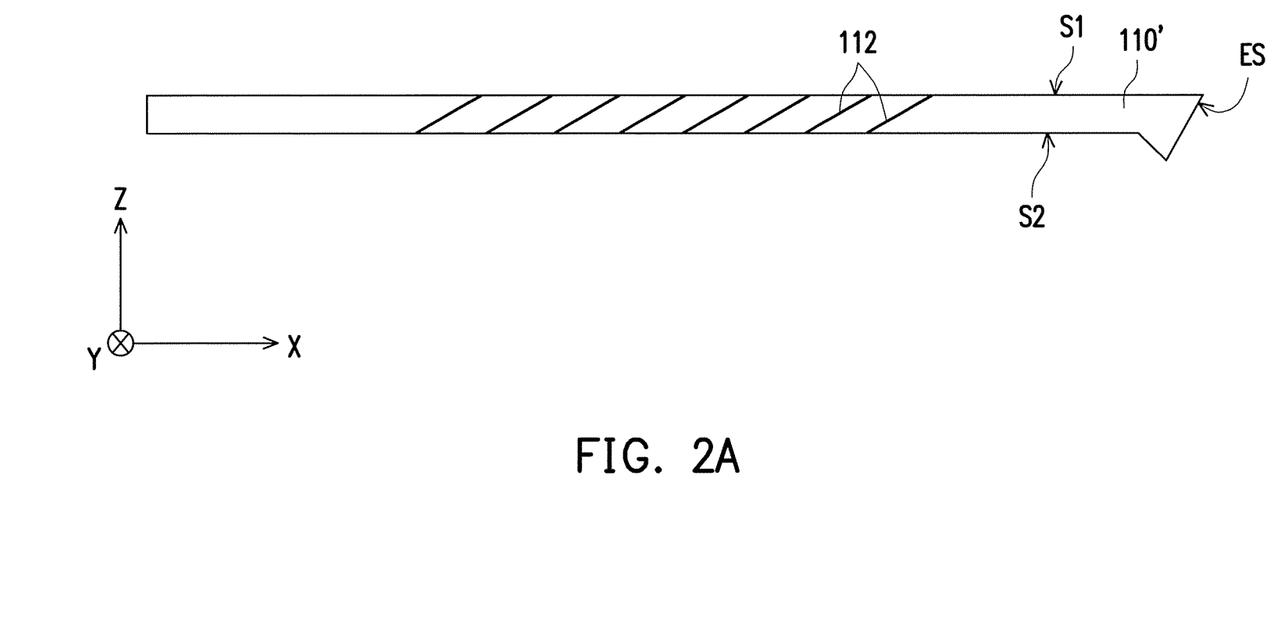
FIG. 2A is a cross-sectional view of a light waveguide device of a comparison example.
Figure 2B:
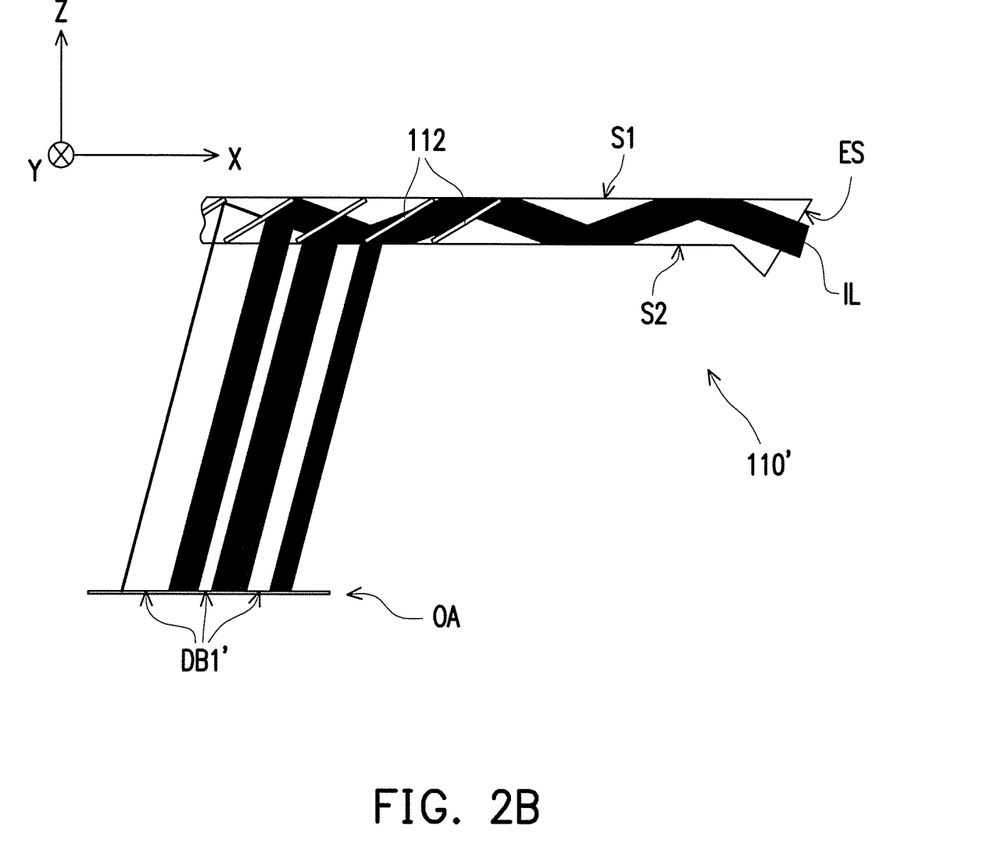
FIG. 2B is a schematic diagram of an optical path along with an optical waveguide device of the comparison example of FIG. 2A transmits an image light.

FIG. 2A is a cross-sectional view of a light waveguide device of a comparison example, and FIG. 2B is a schematic diagram of an optical path along with the optical waveguide device of the comparison example of FIG. 2A transmits the image light. Referring to FIG. 2A and FIG. 2B, in the comparison example, a difference between the optical waveguide device 110' and the optical waveguide device 110 of the embodiment of FIG. 1A is as follows. To be specific, the optical waveguide device 110' does not have the planar reflective structure 114. When the optical waveguide device 110' is applied to the HMD apparatus, the image light IL of the HMD apparatus enters the optical waveguide device 110' through the light entering surface ES. Then, the optical waveguide device 110' transmits the image light IL in the manner of total internal reflection, and the image light IL is transmitted to the observation area OA through the beam splitters 112 of the optical waveguide device 110'. Actually, in order to successfully transmit the image light IL to the observation area OA to satisfy a normal usage requirement, the image light IL has to enter the optical waveguide device 110' in a specific angle. However, when the image light IL is transmitted to the beam splitters 112 by the optical waveguide device 110', a part of region on the beam splitters 112 cannot receive the image light IL. In detail, the region on the beam splitters 112 that does not receive the image light IL may cause uneven spatial distribution of the image light IL transmitted to the observation area OA. When the region on the beam splitters 112 that does not receive the image light IL has a certain size, the user is liable to view dark strips DB1' on the display image (not shown) corresponding to the image light IL from the observation area OA. Namely, when the user uses the HMD apparatus applying the optical waveguide device 110' of the comparison example, the user may view the dark strips DB1' on the display image (not shown) and regard that the HMD apparatus has poor display quality.

Referring to FIG. 1B and FIG. 1F again, since the optical waveguide device 110 of the invention includes the planar reflective structure 114a and the planar reflective structure 114b, the planar reflective structure 114a and the planar reflective structure 114b make the image light IL entering the optical waveguide device 110 through the light entering surface ES to form a plurality of sub image lights, and the sub image lights are propagated in the optical waveguide device 110 through different propagating paths. Therefore, compared to the comparison example of FIG. 2A and FIG. 2B, the region on the beam splitters 112 that does not receive the image light IL is cut to be smaller, such that the dark strips DB1 on the display image (not shown) of the embodiment are smaller than the dark strips DB1' on the display image (not shown) of the comparison example of FIG. 2A and FIG. 2B. In the embodiment, the user is not liable to view the dark strips DB1 on the display image (not shown) corresponding to the image light IL from the observation area OA. Namely, the planar reflective structure 114a and the planar reflective structure 114b may adjust a spatial distribution of the image light IL, such that the spatial distribution of the image light IL transmitted to the observation area OA is more even. When the user uses the HMD apparatus 100 applying the optical waveguide device 110 of the embodiment, the user is not liable to view the dark strips DB1 on the display image (not shown). Therefore, the HMD apparatus 100 has good display quality.

Figure 3A:
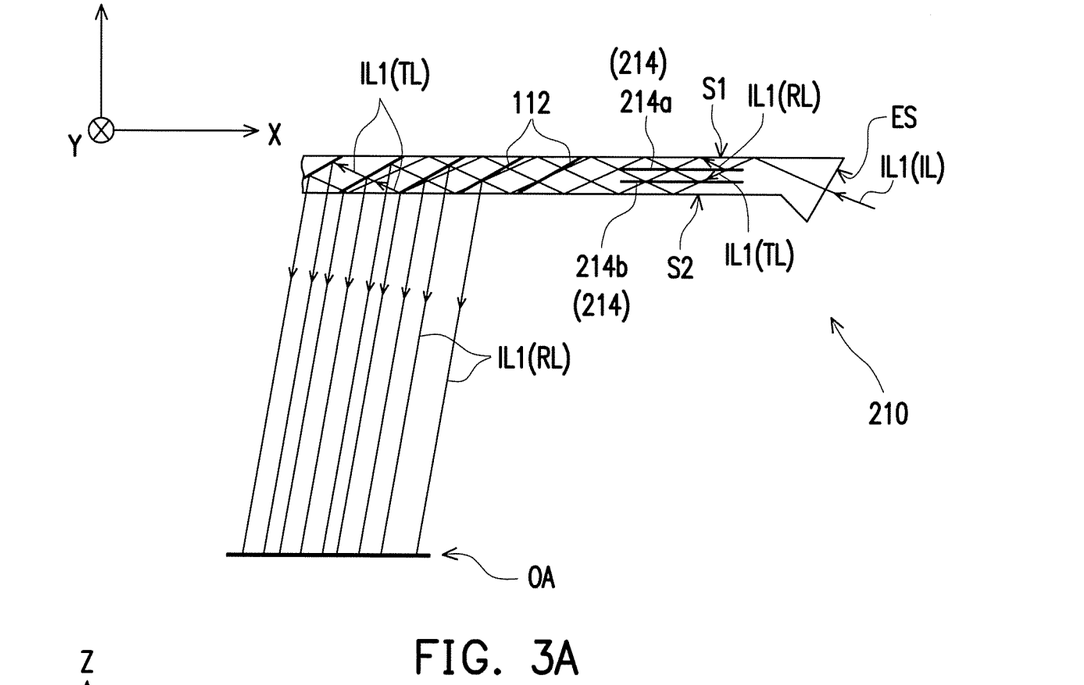
FIG. 3A to FIG. 3C are schematic diagrams of optical paths along which an optical waveguide device transmits a part of an image light according to another embodiment of the invention.
Figure 3B:
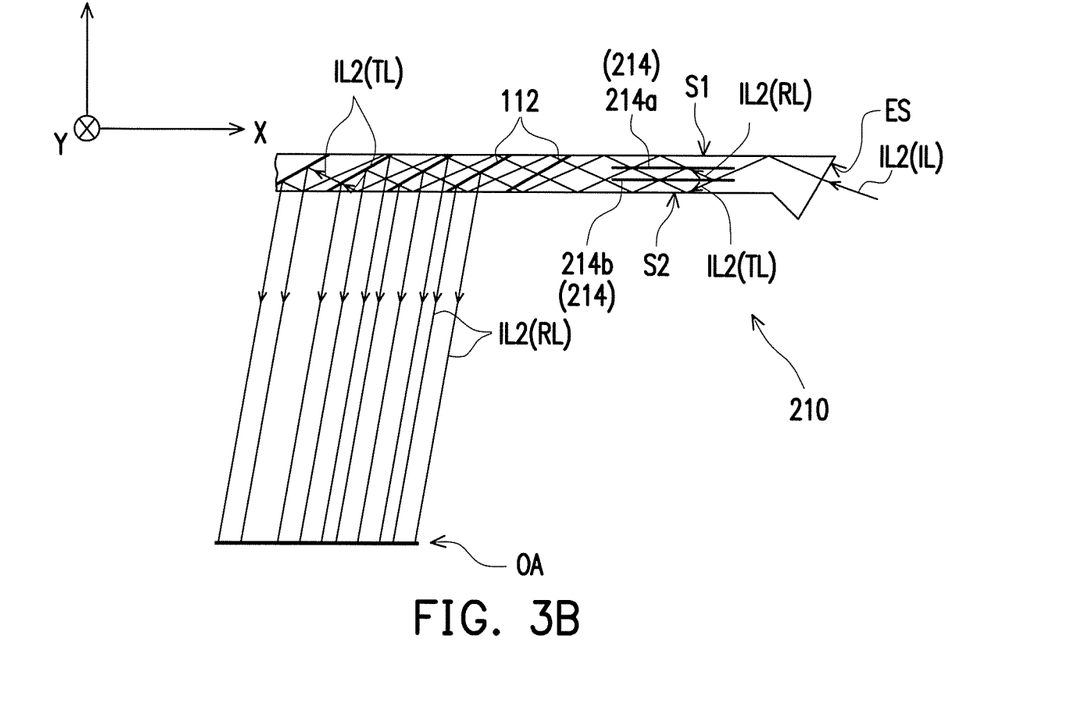
Figure 3C:
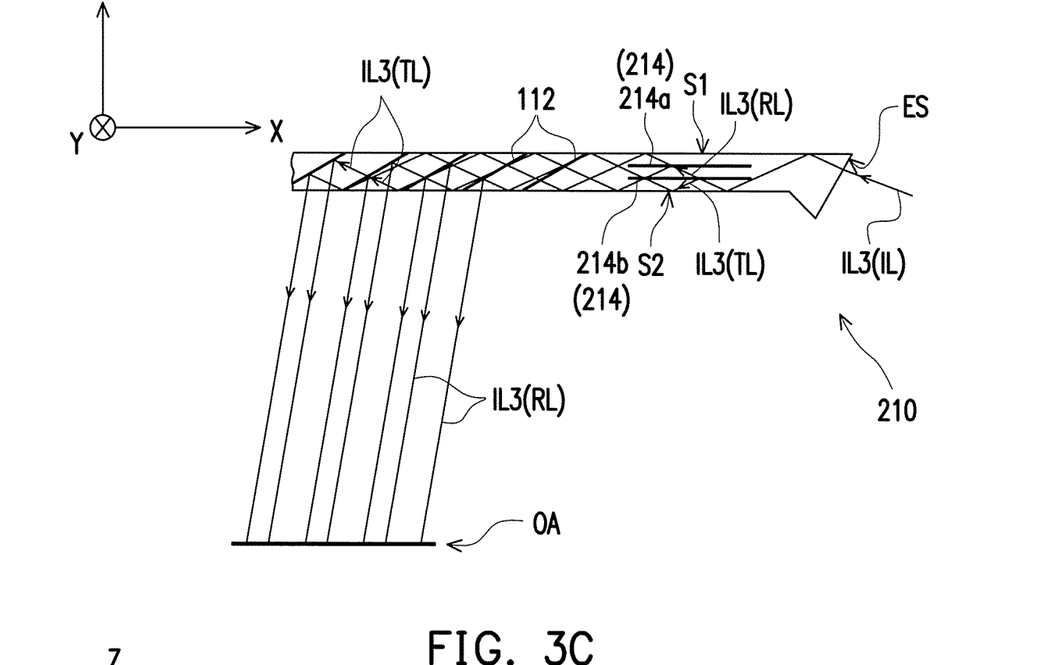

FIG. 3A to FIG. 3C are schematic diagrams of optical paths along which the optical waveguide device transmits a part of the image light according to another embodiment of the invention. Referring to FIG. 3A, in the embodiment, the optical waveguide device 210 is similar to the optical waveguide device 110 of the embodiment of FIG. 1A. The components and related description of the optical waveguide device 210 may refer to the components and related description of the optical waveguide device 110 of the embodiment of FIG. 1A, and detail thereof is not repeated. A difference between the optical waveguide device 210 and the optical waveguide device 110 is as follows. The optical waveguide device 210 includes a plurality of planar reflective structures 214, and the planar reflective structures 214 include a planar reflective structure 214a and a planar reflective structure 214b. To be specific, each of the planar reflective structures 214 may reflect a part of the image light IL, and the other part of the image light IL may penetrate through the planar reflective structure 214. In detail, the planar reflective structure 214a and the planar reflective structure 214b are all trans-reflective structures, and the planar reflective structures 214 can be fabricated by plating a metal film thereon, for an aluminium film or a silver film. Moreover, the planar reflective structures 214 can also be fabricated by plating multiple films, which is not limited by the invention.

In the embodiment, the image light IL includes the sub image light IL1 the sub image light IL2 and the sub image light IL3. In order to clearly indicate a propagating situation of each of the sub image lights in the optical waveguide device 210, FIG. 3A, FIG. 3B and FIG. 3C respectively illustrate the optical paths along which the optical waveguide device 210 transmits the sub image light IL1 the sub image light IL2 and the sub image light IL3, however, in the actual practise, the optical waveguide device 210 actually transmits the sub image light IL1 the sub image light IL2 and the sub image light IL3, simultaneously.

Referring to FIG. 3A, in the embodiment, the sub image light IL1 enters the optical path between the first side surface S1 and the planar reflective structure 214a. When the sub image light IL1 is transmitted to a planar reflective structure 214 (for example, the planar reflective structure 214a), a part of the sub image light IL1 is reflected by the planar reflective structure 214a to from a reflected light RL, and the other part of the sub image light IL1 penetrates through the planar reflective structure 214a to form a through light TL. The reflected light RL and the through light TL of the sub image light IL1 may all have the total internal reflection on the first side surface S1 and the second side surface S2. Moreover, the sub image light IL1 can be continuously reflected by the planar reflective structures 214a and 214b and penetrate through the same to form a plurality of reflected lights RL and a plurality of through lights TL. Then, the sub image light IL1 is transmitted to the beam splitters 112 by the optical waveguide device 210, and is transmitted to the observation area OA.

Then, referring to FIG. 3B and FIG. 3C, in the embodiment, the sub image light IL2 enters the optical path between the planar reflective structure 214a and the planar reflective structure 214b (as shown in FIG. 3B). Moreover, the sub image light IL3 enters the optical path between the planar reflective structure 214b and the second side surface S2 (as shown in FIG. 3C). Similar to the light propagating situation of the sub image light IL1 through the planar reflective structures 214, the sub image light IL2 may form a plurality of reflected lights RL and a plurality of through lights TL, and the sub image light IL3 may form a plurality of reflected lights RL and a plurality of through lights TL. Moreover, the sub image light IL2 and the sub image light IL3 are transmitted to the beam splitters 112 by the optical waveguide device 210, and are transmitted to the observation area OA.

Figure 3D:
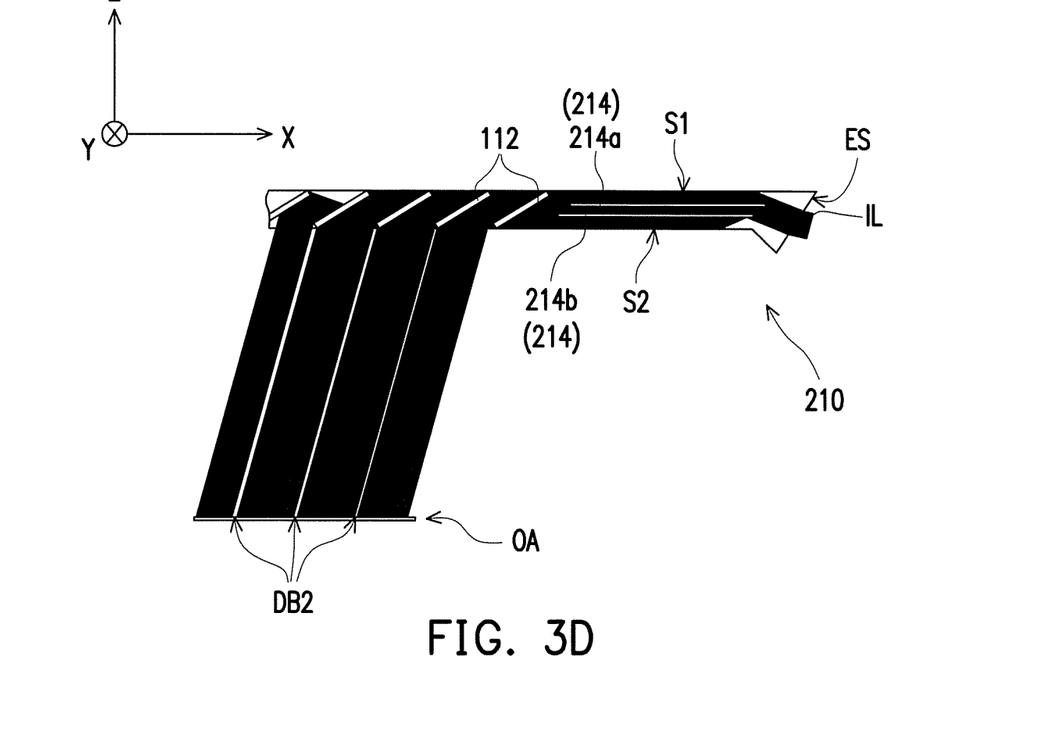
FIG. 3D is a schematic diagram of an optical path along which an optical waveguide device transmits an image light according to the embodiments of FIG. 3A to FIG. 3C.

FIG. 3D is a schematic diagram of an optical path along which the optical waveguide device transmits the image light according to the embodiments of FIG. 3A to FIG. 3C. Referring to FIG. 3D, in the embodiment, when the image light IL enters the optical waveguide device 210 through the light entering surface ES, a propagating path of a part of the image light IL is similar to the propagating path of the sub image light IL1 of FIG. 3A. Moreover, a propagating path of a part of the image light IL is similar to the propagating path of the sub image light IL2 of FIG. 3B. In addition, a propagating path of the other part of the image light IL is similar to the propagating path of the sub image light IL3 of FIG. 3C. When the image light IL is propagated to the beam splitters 112, the beam splitters 112 may transmit a part of the image light IL to the observation area OA. It should be noted that an area and a shape of each of the planar reflective structures 214 and a length thereof in the first axis X can be designed according to an actual optical requirement. For example, in FIG. 3A to FIG. 3C, orthogonal projections of the planar reflective structures 214a and 214b on the XY plane are coincided with each other, and in FIG. 3D, orthogonal projections of the planar reflective structures 214a and 214b on the XY plane are not completely coincided, which is not limited by the invention.

To be specific, since the optical waveguide device 210 includes the planar reflective structures 214 of the planar reflective structure 214a and the planar reflective structure 214b, and the planar reflective structures 214 are all the trans-reflective structures, the planar reflective structure 214a and the planar reflective structure 214b may make the image light IL entering the optical waveguide device 210 through the light entering surface ES to form a plurality of sub image lights, and the sub image lights are propagated in the optical waveguide device 210 through different propagating paths. Therefore, in the embodiment, most of the regions on the beam splitters 112 can receive the image light IL, such that the dark strips DB2 on the display image (not shown) of the embodiment are smaller than the dark strips DB1' on the display image (not shown) of the comparison example of FIG. 2B. Further, the dark strips DB2 on the display image (not shown) of the embodiment are smaller than the dark strips DB1 on the display image (not shown) of the embodiment of FIG. 1F. Therefore, in the embodiment, the user is not liable to view the dark strips DB2 on the display image (not shown) corresponding to the image light IL from the observation area OA. Namely, the optical waveguide device 210 has the similar effects with that of the optical waveguide device 110 of the embodiment of FIG. 1A. When the user uses the HMD apparatus 100 applying the optical waveguide device 210 of the embodiment, the user is not liable to view the dark strips DB2 on the display image (not shown). Therefore, the HMD apparatus has good display quality.

In some embodiments, the planar reflective structures of the optical waveguide device may include at least one first planar reflective structure and at least one second planar reflective structure. Each of the first planar reflective structures reflects a part of the image light IL, and each of the second planar reflective structures reflects at least a part of the image light IL, and the other part of the image light IL penetrates through each of the second planar reflective structures. To be specific, in these embodiments, the planar reflective structures of the optical waveguide device include at least one planar reflective structure 114 of the embodiment of FIG. 1A and at least one planar reflective structure 214 of the embodiment of FIG. 3A. For example, the planar reflective structures may include a planar reflective structure 114 capable of reflecting the image light IL and a planar reflective structure 214 with the trans-reflective property. In these embodiments, the optical waveguide device has the similar effects with that of the optical waveguide device 110 of the embodiment of FIG. 1A. When the user uses the HMD apparatus applying the optical waveguide device of these embodiments, the user is not liable to view the dark strips on the display image. Therefore, the HMD apparatus has good display quality.

Figure 4A:
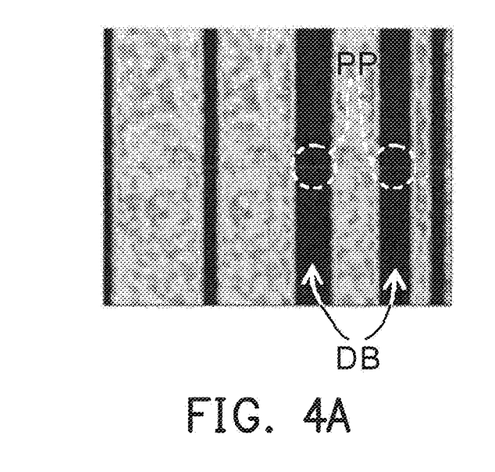
FIG. 4A is a simulation diagram of a light intensity distribution of an observation area of the comparison example of FIG. 2B.
Figure 4B:
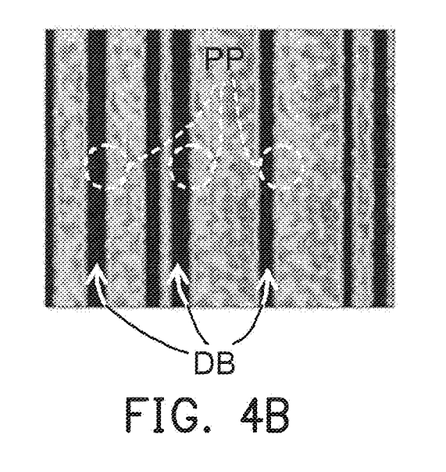
FIG. 4B is a simulation diagram of a light intensity distribution of a HMD apparatus at an observation area according to another embodiment of the invention.
Figure 4C:
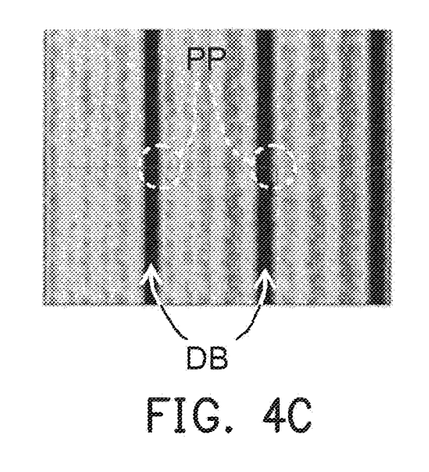
FIG. 4C is a simulation diagram of a light intensity distribution of a HMD apparatus at an observation area according to still another embodiment of the invention.
Figure 4D:
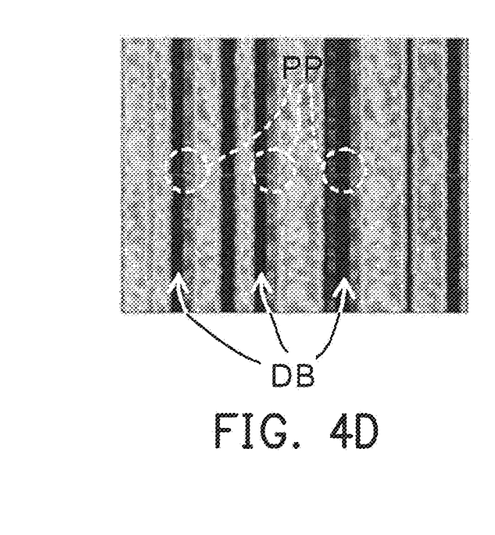
FIG. 4D is a simulation diagram of a light intensity distribution of an observation area of the embodiment of FIG. 1F.
Figure 4E:
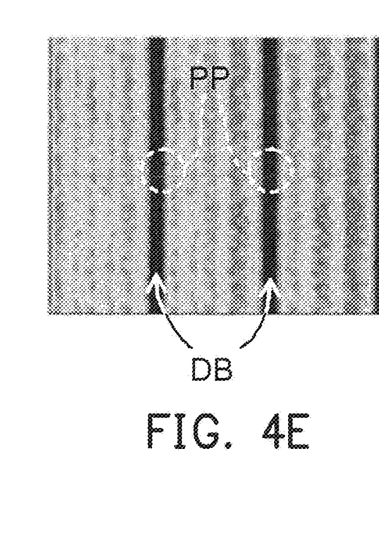
FIG. 4E is a simulation diagram of a light intensity distribution of an observation area of the embodiment of FIG. 3D.

FIG. 4A is a simulation diagram of a light intensity distribution of the observation area of the comparison example of FIG. 2B, FIG. 4B is a simulation diagram of a light intensity distribution of a HMD apparatus at the observation area according to another embodiment of the invention, FIG. 4C is a simulation diagram of a light intensity distribution of a HMD apparatus at the observation area according to still another embodiment of the invention, FIG. 4D is a simulation diagram of a light intensity distribution of the observation area of the embodiment of FIG. 1F, and FIG. 4E is a simulation diagram of a light intensity distribution of the observation area of the embodiment of FIG. 3D. To be specific, in FIG. 4A to FIG. 4E, optical software is adopted to simulate the situation that the image light IL enters the light entering surface ES of the optical waveguide devices of the aforementioned comparison example and the aforementioned embodiments in a specific angle. In the embodiments of FIG. 4A to FIG. 4E, a dimension of the observation area OA is 10 mm×8 mm, and the image light IL is set to an image light corresponding to a white image. Moreover, in FIG. 4A to FIG. 4E, a plurality of pupil positions PP is indicated. A magnitude of a dash line range of each of the pupil positions PP simulates a magnitude of human pupil under irradiation of strong lights, and a diameter thereof is, for example, 1 mm. The pupil positions PP are positions of pupils of the user's eyes when the user views the image light IL at the observation area OA.

Referring to FIG. 2B and FIG. 4A, in the comparison example of FIG. 2B, since the region on the beam splitters 112 that does not receive the image light IL may cause uneven spatial distribution of the image light IL transmitted to the observation area OA, the simulation diagram of the light intensity distribution of FIG. 4A has a plurality of dark strips DB (the same to the dark strips DB1' of the comparison example of FIG. 2B). If the pupils of the user's eyes are just located at the pupil positions PP shown in FIG. 4A, the image light IL is almost impossible to enter the user's eyes, so that the user views the dark strips DB1'.

Then, referring to FIG. IF and FIG. 4D, in the embodiment of FIG. 1F, since the region on the beam splitters 112 that does not receive the image light IL is cut to be smaller, the image light IL transmitted to the observation area OA is more even in spatial distribution. Therefore, although the simulation diagram of the light intensity distribution of FIG. 4D has a plurality of dark strips DB (the same to the dark strips DB1 of the embodiment of FIG. 1F), a width of the dark strips DB in FIG. 4D is smaller than a width of the dark strips DB in FIG. 4A. For example, the width of the dark strips DB in FIG. 4D is smaller than 1 mm. When the pupils of the user's eyes fall on the pupil positions PP shown in FIG. 4D, at least a part of the image light IL enters the user's eyes. Therefore, the user is not liable to view the dark strips DB1.

Referring to FIG. 3D and FIG. 4E, in the embodiment of FIG. 3D, since most of the region on the beam splitters 112 receives the image light IL, the image light IL transmitted to the observation area OA is more even in spatial distribution. Therefore, although the simulation diagram of the light intensity distribution of FIG. 4E has a plurality of dark strips DB (the same to the dark strips DB2 of the embodiment of FIG. 3D), a width of the dark strips DB in FIG. 4E is smaller than the width of the dark strips DB in FIG. 4A. When the pupils of the user's eyes fall on the pupil positions PP shown in FIG. 4E, at least a part of the image light IL enters the user's eyes. Therefore, the user is not liable to view the dark strips DB2.

Moreover, referring to FIG. 4B and FIG. 4C, in the embodiment of FIG. 4B, the optical waveguide device of the HMD apparatus includes the planar reflective structure 114 of the embodiment of FIG. 1A. In the embodiment, the planar reflective structure 114 capable of reflecting the image light IL may result in even spatial distribution of the image light IL transmitted to the observation area OA, such that a width of the dark strips DB in FIG. 4B is smaller than the width of the dark strips DB in FIG. 4A. Therefore, when the pupils of the user's eyes fall on the pupil positions PP shown in FIG. 4B, the user is still not liable to view the dark strips in FIG. 4B. Moreover, in the embodiment of FIG. 4C, the optical waveguide device of the HMD apparatus includes the planar reflective structure 214 of the embodiment of FIG. 3A. In the embodiment, the trans-reflective planar reflective structure 214 capable of reflecting the image light IL may also result in even spatial distribution of the image light IL transmitted to the observation area OA, such that a width of the dark strips DB in FIG. 4C is smaller than the width of the dark strips DB in FIG. 4A. Therefore, when the pupils of the user's eyes fall on the pupil positions PP shown in FIG. 4C, the user is still not liable to view the dark strips in FIG. 4C.

Figure 5A:
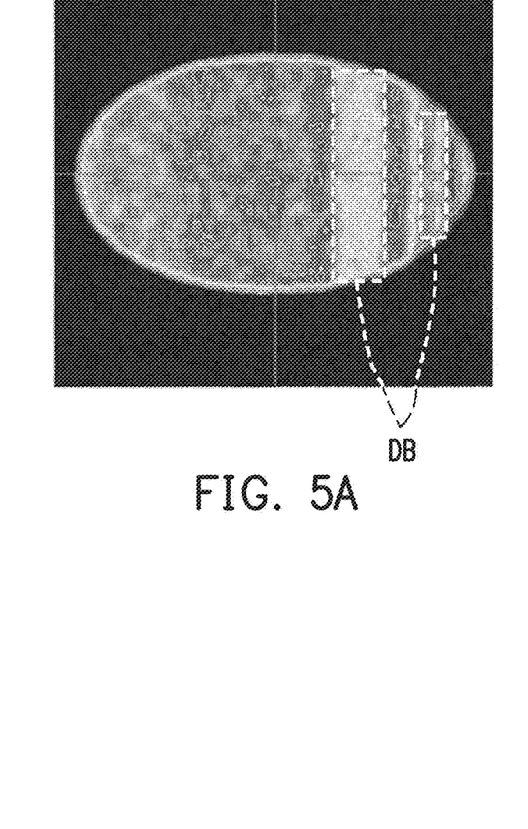
FIG. 5A is a simulation diagram of another light intensity distribution of an observation area of the comparison example of FIG. 2B.
Figure 5B:
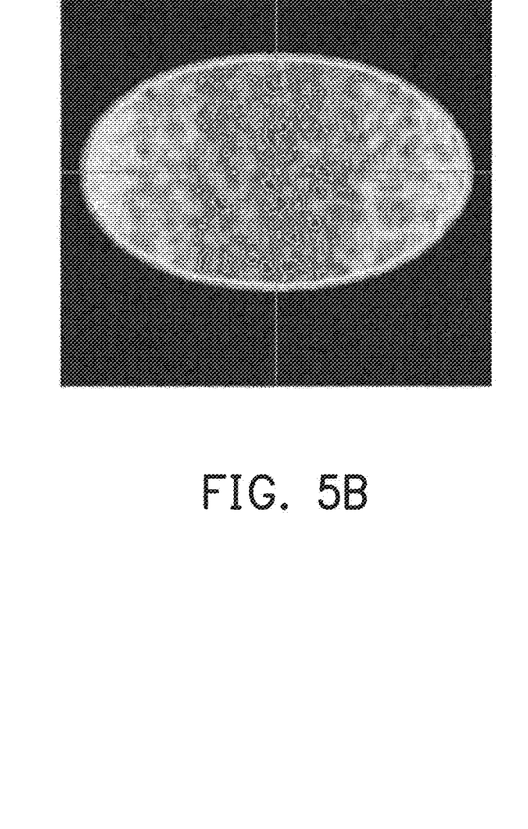
FIG. 5B is a simulation diagram of another light intensity distribution of an observation area of the embodiment of FIG. 3D.

FIG. 5A is a simulation diagram of another light intensity distribution of the observation area of the comparison example of FIG. 2B, and FIG. 5B is a simulation diagram of another light intensity distribution of the observation area of the embodiment of FIG. 3D. To be specific, the simulation diagrams of the light intensity distribution of FIG. 5A and FIG. 5B present light intensity distribution of the image light IL in an observation area with a diameter of 2 mm. A magnitude of the observation area simulates a magnitude of pupils of general human eyes. Moreover, in a simulation setting of FIG. 5A and FIG. 5B, the image light IL is, for example, emitted by an oval light source with a horizontal divergence angle of ±26.7 and a vertical divergence angle of ±15.8. To be specific, since the optical waveguide device 110' corresponding to FIG. 5A does not include the planar reflective structure, and the optical waveguide device 210 corresponding to FIG. 5B includes a plurality of planar reflective structures 214, obvious dark strips DB can be observed in the simulation diagram of FIG. 5A, and none dark strip is observed in the simulation diagram of FIG. 5B.

In summary, the embodiments of the invention have at least one of the following advantages and effects. In the optical waveguide device of the embodiments of the invention, at least one planar reflective structure is disposed between the beam splitters and the light entering surface, and the planar reflective structure is parallel to the first side surface. Moreover, the planar reflective structure and the light entering surface have a distance therebetween, which decrease manufacturing difficulty of the optical waveguide device. The planar reflective structure may separate the image light entering the optical waveguide device through the light entering surface into a plurality of sub image lights, so as to adjust distribution of the image light in the space. Therefore, the optical waveguide device may transmit the image light and evenly distribute the image light in the space. Since the head-mounted display apparatus of the invention includes the aforementioned optical waveguide device, the user is not liable to view dark strips in a display image of the HMD apparatus, so that the head-mounted display apparatus has good display quality.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An optical waveguide device, adapted to transmit an image light, the optical waveguide device comprising:
a light entering surface, wherein the image light enters the optical waveguide device through the light entering surface;
a first side surface, connected to the light entering surface, the light entering surface is inclined with respect to the first side surface;
a second side surface, including an inclined surface and a horizontal surface, wherein the inclined surface is connected to the light entering surface, and the horizontal surface is parallel and opposite to the first side surface; and
at least one planar reflective structure, disposed between the first side surface and the horizontal surface, and parallel to the first side surface and the horizontal surface, wherein the at least one planar reflective structure and the light entering surface are completely separated from each other,
and the at least one planar reflective structure comprises a reflective plane, normal vectors of any two points on the reflective plane are parallel.

2. The optical waveguide device as claimed in claim 1, wherein the number of the at least one planar reflective structure is two or more, and the planar reflective structures are arranged in intervals along a direction perpendicular to the first side surface.

3. The optical waveguide device as claimed in claim 1, wherein the image light entering the optical waveguide device is transmitted to outside of the optical waveguide device by the at least one planar reflective structure and at least one of the first side surface and the second side surface, and each of the planar reflective structures reflects the image light.

4. The optical waveguide device as claimed in claim 3, wherein each of the planar reflective structures reflects a part of the image light, and the other part of the image light penetrates through the planar reflective structure.

5. The optical waveguide device as claimed in claim 3, wherein the number of the at least one planar reflective structure is two or more, and the planar reflective structures comprise at least one first planar reflective structure and at least one second planar reflective structure, each of the first planar reflective structures reflects a part of the image light, each of the second planar reflective structures reflects at least a part of the image light, and the other part of the image light penetrates through each of the second planar reflective structures.

6. The optical waveguide device as claimed in claim 1, wherein the optical waveguide device is made of a transparent material.

7. The optical waveguide device as claimed in claim 1, further comprising a plurality of beam splitters disposed between the first side surface and the second side surface, wherein the beam splitters are parallel to each other and are arranged in intervals.

8. The optical waveguide device as claimed in claim 7, wherein reflectivities of the beam splitters are gradually increased along a direction away from the light entering surface and parallel to the first side surface.

9. The optical waveguide device as claimed in claim 7, wherein the light entering surface and the first side surface include a first included angle therebetween, and each of the beam splitters and the first side surface include a second included angle therebetween, wherein the first included angle is greater than the second included angle.

10. The optical waveguide device as claimed in claim 7, wherein the beam splitters are not parallel to the first side surface and not parallel to the light entering surface.

11. The optical waveguide device as claimed in claim 7, wherein the image light entering the optical waveguide device is transmitted to one of the beam splitters by the at least one planar reflective structure and at least one of the first side surface and the second side surface, and the at least one planar reflective structure reflects the image light.

12. The optical waveguide device as claimed in claim 11, wherein after the image light is reflected by at least one of the beam splitters, the image light leaves the optical waveguide device through one of the first side surface and the second side surface.

13. A head-mounted display apparatus, comprising:
a display, adapted to provide an image light; and
an optical waveguide device, disposed beside the display, and comprising:
a light entering surface, wherein the image light enters the optical waveguide device through the light entering surface;
a first side surface, connected to the light entering surface, the light entering surface is inclined with respect to the first side surface;
a second side surface, including an inclined surface and a horizontal surface, wherein the inclined surface is connected to the light entering surface, and the horizontal surface is parallel and opposite to the first side surface; and
at least one planar reflective structure, disposed between the first side surface and the horizontal surface, and parallel to the first side surface and the horizontal surface, wherein the at least one planar reflective structure and the light entering surface are completely separated from each other,
and the at least one planar reflective structure comprises a reflective plane, normal vectors of any two points on the reflective plane are parallel.

14. An optical waveguide device, adapted to transmit an image light, the optical waveguide device comprising:
a light entering surface, wherein the image light enters the optical waveguide device through the light entering surface;
a first side surface, connected to the light entering surface, the light entering surface is inclined with respect to the first side surface;
a second side surface, including an inclined surface and a horizontal surface, wherein the inclined surface is connected to the light entering surface, and the horizontal surface is parallel and opposite to the first side surface; and
at least one planar reflective structure, disposed between the first side surface and the horizontal surface, and parallel to the first side surface and the horizontal surface, wherein the at least one planar reflective structure and the light entering surface are completely separated from each other,
wherein the number of the at least one planar reflective structure comprises one, and the planar reflective structure is a planar reflective plane.

* * * * *